United States Patent [19]

Melaja

[11] 3,816,175
[45] June 11, 1974

[54] PROCESS FOR FORMATION OF CRYSTALLINE FRUCTOSE-GLUCOSE BLENDS

[75] Inventor: Asko J. Melaja, Kantvik, Finland

[73] Assignee: Suomen Sokeri Osakeyhtio (Finnish Sugar Company), Helsinki, Finland

[22] Filed: July 3, 1972

[21] Appl. No.: 268,501

[52] U.S. Cl. .................... 127/60, 127/30, 127/58
[51] Int. Cl. ...................... C13k 1/10, C13k 9/00
[58] Field of Search ......... 127/30, 58, 60; 99/141 R

[56] References Cited
UNITED STATES PATENTS

| | | | |
|---|---|---|---|
| 3,704,168 | 11/1972 | Hara | 127/58 |
| 3,743,539 | 7/1973 | Kroyer | 127/16 |
| 3,756,855 | 9/1973 | Duchateau | 127/30 X |

*Primary Examiner*—Morris O. Wolk
*Assistant Examiner*—Sidney Marantz
*Attorney, Agent, or Firm*—Brumbaugh, Graves, Donohue & Raymond

[57] ABSTRACT

A dry, granulated, free-flowing product containing a mixture of fructose and glucose, e.g. invert sugar, is prepared by first combining a fructose and glucose solution having a high dry solids content with an essentially dry, crystalline mass comprising a mixture of fructose and glucose. The admixture of solution and crystalline mass are then agitated in a relatively dry atmosphere, i.e., less than about 30 percent relative humidity, at a temperature from about 20°C to about 50°C to form the dry, granulated, free-flowing product.

7 Claims, No Drawings

PROCESS FOR FORMATION OF CRYSTALLINE FRUCTOSE-GLUCOSE BLENDS

The present invention is a process for forming a dry, free-flowing, granular mixture which comprises a mixture of fructose and glucose. It is particularly directed to forming a dry invert sugar product, i.e., a product that contains approximately equal amounts of fructose and glucose.

Sugar products which contain mixtures of fructose and glucose, e.g. invert sugar which contains approximately equal amounts of these substances, are generally produced and marketed in the form of solutions having a dry solids content of from about 60 percent to about 75 percent by weight. Semi-solid preparations, e.g., invert sugar with a dry solids content of from about 80 percent to about 85 percent by weight, are also known. The use of such solutions and semi-solid preparations does, however, pose problems since they are difficult to handle during shipment and do not have good storage properties due in large part to their sensitivity to microbiotic contamination and deterioration. Therefore, a need exists for a process for forming an essentially dry, free-flowing, granular product containing glucose and fructose which will be easier to handle during shipment and which will have less sensitivity to microbiotic contamination and deterioration.

The need for such a process is especially great with regard to invert sugar, a mixture of equal amounts of fructose and glucose since dry invert sugar is a product having substantial commercial importance. It is nearly as sweet as sucrose and can be substituted for sucrose in most products. Invert sugar solutions or semi-solid preparations have been commonly used in a number of bakery and confectionery products and in soft drinks, but since the absence of water is required in some applications, the use of these invert sugar solutions and semi-solid preparations has not been possible.

The prior art has used vacuum evaporation techniques, e.g. as described in *Confectionery Production*, November 1967, p. 792, to produce a dry invert sugar product from invert sugar solutions. However, these processes commonly produce an amorphous glassy product rather than the dry, free-flowing product which is desired. Although, as described in Kusch et al. U.S. Pat. No. 3,513,023 and British Pat. No. 1,117,903, it is possible to produce highly pure dry fructose simply by seeding a fructose solution with fructose crystals and then agitating the admixture in a cool atmosphere, it has been generally believed that such a process cannot be used if dextrose, i.e., dextro-rotatory glucose, is present. This was suggested by Young et al. in U.S. Pat. No. 2,588,449. The applicant has unexpectedly found that it is possible to produce a fructose-glucose product by seeding a fructose-glucose solution with fructose-glucose crystals and agitating the admixture in a cool, dry atmosphere.

The present invention is a process for forming a dry, granular, free-flowing sugar product which comprises a mixture of fructose and glucose. The process is preferably used to form dry products in which the fructose content varies from 25 to 75 percent by weight of the product with the remainder being glucose. However, for purposes of illustrating the present invention, the description will be mainly directed to the use of the process to form invert sugar, a product containing equal amounts of fructose and glucose. The process is useful in producing an invert sugar from a starting material which is formed by enzymatic isomerization of glucose or glucose syrup of starch origin. It is particularly useful in producing a dry invert sugar from purified isomerized corn syrup, thus making it possible to produce a dry sugar mixture equally as sweet as sucrose from starch.

The starting material for the applicant's process is a solution which comprises fructose and glucose, e.g. an invert sugar solution, which has been purified and desalted by ion exchange treatment and which has been evaporated under vacuum so that it has a high dry solids content, i.e., a solids content of at least about 94 percent. Such a starting material is known in the art, and the methods for its preparation by the above-mentioned purification, desalting and ion-exchange procedures are described in a number of prior art patents and publications, including H. Schneider, *International Sugar Journal*, p. 101 (1971) and Haack et al. U.S. Pat. No. 3,511,705.

In order to form the product of the present invention, an invert sugar solution having a 94 percent by weight or greater solids content is cooled to a temperature within the range of from about 40°C to about 50°C and is combined at this temperature with a mixture to glucose and fructose in the form of a dry, finely divided powder. Preferably, the composition of the glucose-fructose mixture is approximately the same as the product to be produced by the process. The glucose in the powder is preferably in the form of glucose monohydrate crystals whereas the fructose is in the form of anhydrous fructose crystals. The step of combining the solution and dry powdered mixture can be carried out by either seeding the solution with the mixture of glucose and fructose crystals or by adding the sugar solution to the crystal mixture.

Once the combination of solution and dry crystal mixture has been made, the admixture of these two components is agitated and is cooled in a dry atmosphere having a relative humidity of not greater than about 30 percent at a temperature of from about 20°C to about 50°C until a dry product is formed. This step of agitating the mixture in a cool dry atmosphere causes the excess water present in the mixture to be bound as crystal water in the glucose monohydrate component in a simultaneous crystallization of fructose and glucose monohydrate.

The ratio of crystals to solution that is employed in the combination step is dependent upon the crystal size and the type of mixer used in the agitation step as well as on the working conditions, i.e., temperature and relative humidity during agitation. Thorough mixing of the seed crystals into the solution is essential, and, in order to obtain rapid and good crystallization, it is necessary to provide a maximum total seed crystal surface area to the solution and to keep distances between the seed crystals at a minimum. By using very finely divided seed crystals, it is possible to obtain a large total surface with a fairly small amount of seed crystals. If larger crystal sizes are used, more seed crystals must be added for the same total surface area. The working conditions of the mixer also cause the practical limits and the optimum conditions to vary somewhat. For example, in a thermal processor-type mixer good results are obtained if the ratio of crystals to solution is from about 0.3:1 to about 10.0:1 by weight and the mean seed crystal size is 0.1 mm. in diameter. Cooling the admixture to about 35°C and agitating it in an atmosphere of less than 30 percent relative humidity gives good results in a thermal processor-type mixer. If the admixture contains greater than 75 percent by weight glucose, the short contact time and the high temperature of a thin film evaporator are needed. A granulated invert sugar mass forms in 3 to 4 hours under such conditions and contains agglomerated crystals of glucose monohydrate and fructose.

The total water content of the substantially dry invert product is approximately 4 percent to 5 percent as determined by the Karl Fischer method which is described in "International Commission for Uniform Methods of Sugar Analysis," Report of the Proceedings of the 15th Session, pp. 120–122 (1970). The product that is formed is stable under normal conditions and does not change in texture, color or other physical attributes during storage at room temperature in a dry atmosphere for several weeks.

The method of the present invention, if desired, is easily carried out continuously in the type of thermal processor-type heat exchanger described in the Mar. 22, 1971 edition of *Chemical Engineering* at page 96. In such a processor a part of the dry product is withdrawn, and the rest is recirculated to form seed crystals in a continuous crystallization process.

The process of the present invention is further exemplified by the following Examples:

EXAMPLE I

An invert sugar solution which was prepared and purified by conventional ionic exchange methods was evaporated in a continuous thin film evaporator. The temperature of the evaporator was 74°C at the inlet and 91°C at the outlet. The vacuum was 0.2 atmospheres and the contact time was about 1 minute. The invert sugar solution produced in the evaporator had a 94.5 percent dry solids content by weight.

A dry crystal mixture of glucose monohydrate and fructose (50:50 by weight), i.e., invert sugar, with a mean crystal size of about 0.1 mm. diameter was fed into a thermal processor and the invert sugar solution was added. The ratio of crystals to solution was 100 kg. to 40 kg. or 2.5:1. The mixture was cooled to 35°C and simultaneously agitated in a dry atmosphere of 20 percent relative humidity for 3 hours. A granulated dry mass was formed containing equal amounts of agglomerated glucose monohydrate and fructose crystals, i.e., invert sugar. The water content of the free-flowing product was 4.7 percent determined by the Karl Fischer method.

EXAMPLE II

An invert sugar solution was prepared and evaporated as in Example I. One hundred kg. of dry invert sugar product from Example I was crushed to a mean particle size of about 0.1 mm. diameter and was fed to a thermal processor. About 40 kg. of the invert sugar solution (94.5 percent dry solids content) was then added, and the mixture was cooled to about 35°C and was simultaneously agitated in a dry atmosphere of 20 percent humidity for 3 hours. A dry granular sugar mass was formed containing agglomerated glucose monohydrate and fructose crystals having a water content of 4.8 percent determined by the Karl Fischer method.

EXAMPLE III

Three hundred grams of purified and desalted invert sugar solution with a dry solids content of 95 percent was seeded with 120 grams of a mixture of powdered glucose and fructose crystals having a mean particle size of 0.04 mm. The admixture was agitated in an atmosphere having a relative humidity of below 30 percent to 40°C for 8 hours. A dry granulated invert sugar product was formed.

It can be seen from the foregoing that the present process enables one to produce a dry free-flowing, granulated product containing glucose and fructose. Such a process is especially useful in the production of dry, granulated, invert sugar.

As persons skilled in the art read the foregoing specification, they will become aware of modifications that can be made to the present process without departing from the spirit and scope of the invention. Therefore, the foregoing is intended to be merely illustrative of a number of embodiments of the present invention. The scope of the invention is defined in the appended claims.

I claim:

1. A process for forming a dry granular mixture which contains fructose and glucose from an aqueous solution thereof comprising:
   a. combining at a temperature in the range from about 40°C to about 50°C an aqueous solution containing fructose and glucose, wherein the solids content is at least about 95 percent by weight, with a dry crystal mass containing fructose and glucose; and
   b. agitating the admixture of the solution and crystal mass in a relatively dry atmosphere in which the relative humidity is less than about 30 percent to form the dry granular mixture.

2. A process as claimed in claim 1 wherein the agitation of the admixture of the solution and the crystal mass is performed at a temperature in the range of from about 20°C to 50°C.

3. A process as claimed in claim 1 wherein the sugar solution is seeded with the dry crystal mass.

4. A process as claimed in claim 1 wherein the sugar solution is added to the dry crystal mass.

5. A process as claimed in claim 1 wherein the weight ratio of the crystal mass to the solution is from about 0.3 to 1 to about 10.0 to 1 on a weight basis.

6. A process as claimed in claim 1 wherein the sugar solution has a fructose content ranging from 25 to 75 percent by weight with the remainder being glucose.

7. A process as claimed in claim 1 wherein the sugar solution, the dry sugar crystal mass and the product comprise invert sugar.

\* \* \* \* \*